United States Patent [19]

Suzuki

[11] Patent Number: 4,644,233
[45] Date of Patent: Feb. 17, 1987

[54] D.C. BRUSHLESS MOTOR HAVING WIDER AND NARROWER POLE PARTS

[75] Inventor: Yasuo Suzuki, Shijonawate, Japan
[73] Assignee: Matsushita Electric Works, Ltd., Osaka, Japan
[21] Appl. No.: 763,995
[22] Filed: Aug. 9, 1985
[30] Foreign Application Priority Data

Aug. 25, 1984 [JP] Japan .................. 59-177016
Sep. 25, 1984 [JP] Japan .................. 59-199917

[51] Int. Cl.$^4$ ............................ H02K 29/08
[52] U.S. Cl. ...................... 318/254; 318/138; 318/439; 310/68 R
[58] Field of Search ........... 318/138, 254 A, 254, 318/439; 310/46, 68 R

[56] References Cited

U.S. PATENT DOCUMENTS

| | | | |
|---|---|---|---|
| 3,614,495 | 10/1971 | Suzuki et al. | 310/162 |
| 4,096,419 | 6/1978 | Wren et al. | 318/254 A X |
| 4,105,940 | 8/1978 | Kuhnlein | 318/254 A X |
| 4,429,263 | 1/1984 | Muller | 318/254 |
| 4,458,184 | 7/1984 | Kawate | 310/46 X |
| 4,553,075 | 11/1985 | Brown et al. | 318/254 |

FOREIGN PATENT DOCUMENTS

| | | | |
|---|---|---|---|
| 49-148408 | 10/1974 | Japan | 318/254 |
| 54-30411 | 3/1979 | Japan | 318/254 |
| 54-113018 | 9/1979 | Japan | 318/254 |
| 54-118511 | 9/1979 | Japan | 318/254 |
| 59-25596 | 2/1984 | Japan | 318/254 |

*Primary Examiner*—Bernard Roskoski
*Assistant Examiner*—Bentsu Ro
*Attorney, Agent, or Firm*—Burns, Doane, Swecker & Mathis

[57] ABSTRACT

A D.C. brushless motor wherein one of projected stator poles positioned forward and rearward in rotational direction of a rotor is deviated from a circumferentially equally spaced position with respect to the other stator pole by a predetermined electric angle and is made sufficiently smaller than the other, the stator poles being respectively polarized depending on controllably varied direction of direct current to coils on the poles by means of a rotor position detecting Hall element which detects the polarity at a predetermined position of the rotor, for allowing the rotor to self-start with a remarkably increased starting torque.

1 Claim, 11 Drawing Figures

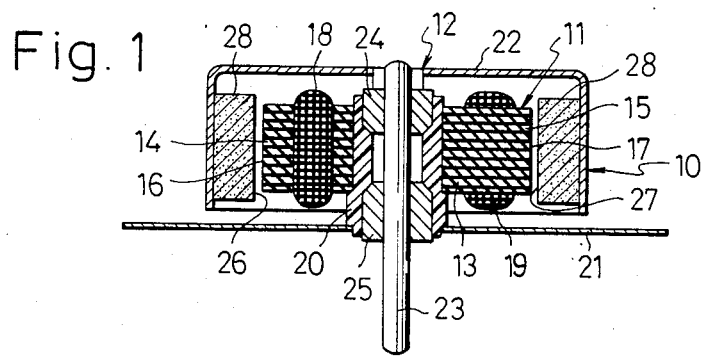
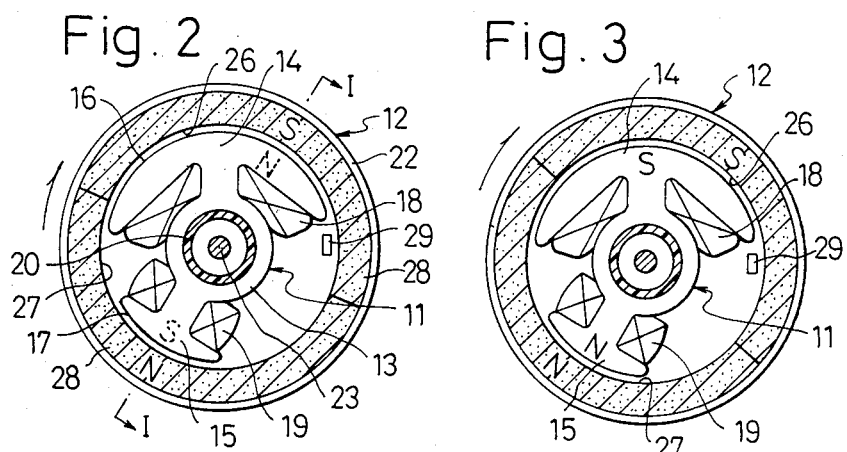
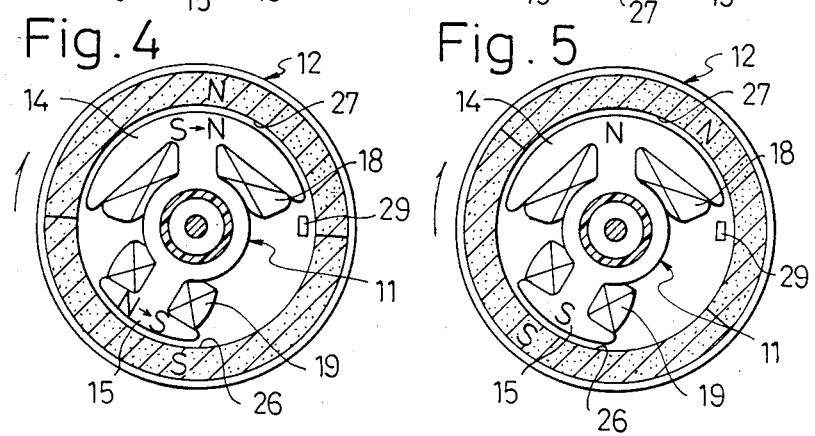

D.C. BRUSHLESS MOTOR HAVING WIDER AND NARROWER POLE PARTS

TECHNICAL BACKGROUND OF THE INVENTION

This invention relates to DC brushless motors and, more particularly, to a brushless motor which functions to self-start with a direct current to be optimumly utilizable in small electrical appliances.

The DC brushless motor of the type referred to comprises a stator including a core and coils wound on the core for exciting radially projected pole parts of the stator to alternately oppositely polarize them, and a rotor of a permanent magnet magnetized, for example, to be circumferentially sequentially opposite in the polarity, the stator being disposed so that the direct current fed to the stator coils sequentially in opposite directions will cause the rotor to be rotated, and the motor is useful when employed for driving in particular such a small electrical appliance as a cooling fan and the like.

DISCLOSURE OF PRIOR ART

In the DC brushless motors, generally, the magnetic pole parts projected out of a core part of the stator to oppose the magnetized inner peripheral surface of the outer rotor have been made to be all equally dimensioned, and it has been necessary to provide a separate means for providing to the rotor a starting moment in a predetermined direction because such stator arrangement provides no self-startability to the rotor, so as to have the rotor rotated always in the predetermined direction, but this has been causing the arrangement to be considerably complicated.

A DC brushless motor having the self-startability achieved only by existing constituent members has been suggested in U.S. Pat. No. 4,429,263 to Rolf Müller, in which the rotor comprises a four-pole permanent magnet alternately oppositely polarized symmetrically about the rotary axis, and the stator is formed to have four symmetrically disposed and substantially T-shaped pole parts carrying coils for exciting the pole parts alternately to be of opposite polarities, respective gaps between the inner peripheral surface of the rotor and the outer peripheries of the pole parts being gradually made larger in the counterclockwise direction so that, in non-excitation state, the magnetic flux density in the gaps will be higher on the side of one circumferential end in the clockwise direction of each pole part than that on the side of the other end in the counterclockwise direction, and the rotor will stand still with the center of the respective pole zones disposed as deviated slightly in the clockwise direction from the center of the respective opposing pole parts of the stator. When the stator pole parts are excited respectively to have the same polarity as opposing one of the rotor pole zones, therefore, magnetically repulsive action takes place between the opposing stator and rotor poles to cause the rotor to rotate in the clockwise direction, and thus the brushless motor of the U.S. Patent is provided with the self-startability.

As is clear to those skilled in the art, on the other hand, the extent of the deviation between the stator and rotor poles in the non-excitation state is directly contributive to the starting motion or torque of the motor, and in this respect the motor of the U.S. Patent is still defective in that the starting torque cannot be made larger because the mere gradual increase of the gaps in the counterclockwise direction of the stator pole parts with respect to the rotor poles can result only in a relatively small circumferential deviation of the rotor poles with respect to the stator pole parts.

The present inventor has developed various unique models of motors achieving the self-startability with a high starting torque, one of which having been suggested in U.S. Pat. No. 3,614,495 of Oct. 19, 1971 to the inventor and Yasuyoshi Kameyama, and the development has been eagerly continued for years on the basis of the principle of the unique models. Suggested in this U.S. Pat. No. 3,614,495 is an A.C. motor with surface opposing stator and rotor, in which the rotor consists of a disk-shaped permanent magnet magnetized to have alternate poles at regularly radially divided areas, and the stator also disk-shaped is made to have radially extended pole teeth corresponding in number to the rotor poles and including alternately disposed wider main teeth and narrower shading teeth, positions of the latter of which being deviated to be respectively closer to one of the adjacent main pole teeth in a desired rotating direction of the rotor, so that the respective pole teeth excited to be alternately of opposite polarities will cause the rotor self-started to rotate in the deviated direction. When the width of the respective main pole teeth is made twice that of the shading pole teeth, a sufficiently large electric angle difference for a large starting torque can be obtained between the main and shading pole teeth with respect to the rotor poles.

Such arrangement as above in the A.C. motor of the surface-opposing rotor and stator has not been able to be immediately applied to the DC motors of, for example, the outer rotor type, and it has been demanded to provide a DC brushless motor in which the principle of the U.S. Pat. No. 3,614,495 is effectively utilized.

TECHNICAL FIELD OF THE INVENTION

A primary object of the present invention is, therefore, to provide a DC brushless motor which can achieve the self-startability with a sufficiently large starting torque without increasing the number of parts.

According to the present invention, this object can be realized by providing a DC brushless motor comprising a stator including coils wound on a core part for exciting at least a pair of magnetic pole parts projected from the core part to be alternately of opposite polarities, and a rotor of a permanent magnet magnetized to have alternately oppositely polarized surfaces circumferentially continuous in the rotational direction of the rotor and rotated by a direct current fed to the coils of the stator as alternately reversed in the current flowing direction, wherein the central line of one of the pole parts of the stator positioned forward and rearward in the rotational direction is deviated from a symmetrical position with respect to the central line of the other pole part by a predetermined electric angle and is made sufficiently smaller than the other pole part to obtain a large starting torque, and the flowing direction of DC fed to the stator coils can be controlled in response to positions of the rotor magnet detected by a Hall effect sensing element provided for detecting the polarity of one of the magnetized surfaces of the rotor magnet at a predetermined position.

Other objects and advantages of the present invention shall become clear from the following description of the invention detailed with reference to preferred embodiments shown in accompanying drawings.

BRIEF EXPLANATION OF THE DRAWINGS

FIG. 1 is a vertical sectional view of a DC brushless motor in an outer rotor type according to an embodiment of the present invention taken along line I—I in FIG. 2;

FIG. 2 is a horizontal sectional view of the brushless motor of FIG. 1;

FIGS. 3 to 5 are sectional views similar to FIG. 2 for showing respectively different states in rotating operation of the rotor in the motor of FIG. 1;

Figure 6:
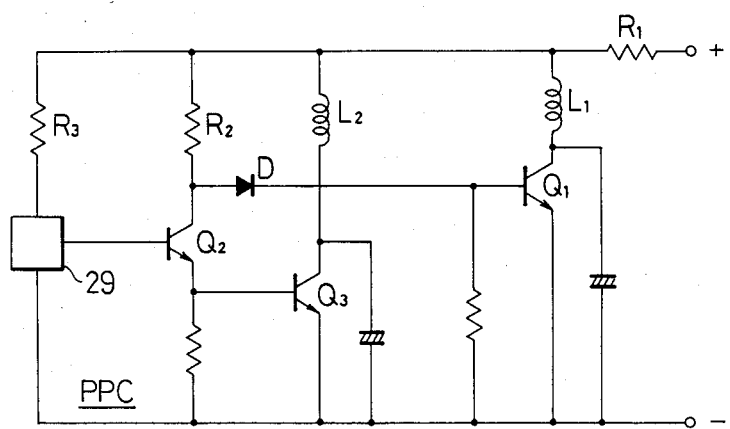
FIG. 6 shows a power supply control circuit for stator coils used in the present invention.

While the present invention shall now be described with reference to the preferred embodiments shown in the drawings, it should be understood that the intention is not to limit the invention only to the particular embodiments shown but rather to cover all alterations, modifications and equivalent arrangements possible within the scope of appended claims.

DISCLOSURE OF PREFERRED EMBODIMENTS

Referring to FIGS. 1 to 5, there is shown an outer rotor type two-pole DC brushless motor 10 according to an embodiment of the present invention, which comprises a stator 11 and a ring-shaped rotor 12 disposed coaxially about the stator. More specifically, the stator 11 includes a laminar assembly core 13 formed to have two pole parts including a wider pole 14 and a narrower pole 15 which are projected radially out of a central body part of the core 13 and circumferentially expanded to form, for example, a generally T shaped so that wider end surface 16 of the pole 14 and a narrower end surface 17 of the other pole 15 will respectively form a part of a cylindrical surface spaced by a small gap from the inner peripheral surface of the outer disposed rotor 12. In the illustrated embodiment, the axial central lines of these poles 14 and 15 are positioned asymmetrical such that the central line of the narrower pole 15 will be deviated from a position diametrally opposing the central line of the wider pole 14 to be closer in the rotational direction of the rotor, and the circumferential width of the narrower pole 15 is made sufficiently smaller than that of the wider pole 14, so that the two-pole arrangement can provide a large starting torque. More particularly, the positional deviation of the narrower pole 15 is so set, as represented by the electric angle from the central line of the wider pole 14 to that of the narrower pole 15 in a direction opposite the rotational direction (the latter being clockwise in the drawings), as to be preferably 140 to 160 degrees, and the circumferential width of the narrower pole 15 is 40-60% of the wider pole 14.

In the stator 11, further, coils 18 and 19 are wound on radially projected leg portions of the poles 14 and 15, so that a direct current will be supplied to the coils to flow therethrough mutually in opposite directions through a control circuit which will be detailed later so that the poles 14 and 15 will be magnetized alternately to be of opposite polarities. Further, the core 13 is axially secured to a hollow, cylindrical supporting sleeve 20 which in turn is secured at one axial end to a mounting frame 21.

The rotor 12 comprises a reverse cup-shaped yoke 22 secured at the center of the top wall to the upper end of a rotary shaft 23 which is passed through the supporting sleeve 20 and projects downwardly from the frame 21 to be rotatably held in the sleeve 20 by means of upper and lower bearings 24 and 25 provided therein. Fixedly mounted to the inner peripheral wall of the yoke 22 as opposed to the stator pole end surfaces 16 and 17 through the small gap is a cylindrical permanent magnet 28 which has two magnetized surfaces 26 and 27 of mutually opposite polarities and respectively extending substantially over a range 180 degrees in the electric angle (likewise in the mechanical rotary angle in the present instance). The permanent magnet may comprise, instead of the cylindrical member magnetized as above, two semicylindrical permanent magnets which are magnetized to be of opposite polarities to each other on their inner peripheral surface and coupled integral, as shown in the drawings in practice as a preferable aspect.

Inside the rotor 12 and at a position spaced in its rotational direction substantially by 90 degrees in the electric angle from the central line of the wider stator pole 14, a Hall effect element 29 formed in an integrated circuit or the like is provided for sensing positions of the rotor by detecting the polarity of one of the magnetized rotor surfaces 26 and 27 which is disposed to oppose the element, detected signals of which are provided to a coil current control circuit which will be explained later.

The operation of the brushless motor 10 of the foregoing embodiment will be detailed with reference to FIG. 6 showing a power supply control circuit PCC to the coils 18 and 19. When no electric power is supplied to the coils 18 and 19 and thus the motor is in its non-excited state, the rotor 12 stably remains stationary at such a position as shown in FIG. 2 in which the center of the magnetized surface 27 is substantially aligned with the center of the deviated narrower stator pole 15, because the relatively smaller circumferential width of the narrower stator pole 15 causes the magnetic flux from the magnetized rotor surface 27 to be concentrated at the narrower pole 15 whereas the relatively larger circumferential width of the wider stator pole 14 allows the magnetic flux from the other magnetized rotor surface 26 to pass to the wider pole 14 without concentration. In other words, magnetic constraining force of the narrower pole 15 with respect to the rotor 12 is larger than that of the wider pole 14. FIG. 2 shows just as an example a state in which the N-pole magnetized rotor surface 27 remains stationary as opposed centrally to the narrower stator pole 15, but it will be apparent that the other S-pole magnetized rotor surface 26 takes the place of the N-pole surface 27 in an event where the S-pole surface 26 is located on the side of the narrower stator pole 15 at the final stage of a rotation of the rotor 12.

In the above state of the rotor, the Hall effect element 29 at the position spaced by the electric angle of 90 degrees from the central line of the wider pole 14 faces the magnetized rotor surface 26 (S-pole in FIG. 2) which opposes the stationary wider pole 14, so that the element 29 will always detect the polarity (here the S-pole) of the magnetized rotor surface opposed to the wider stator pole 14. In the illustrated embodiment, the Hall effect element 29 is of a type activated by the N-pole so that a detection of the S-pole causes the element to be turned OFF while, with a detection of the N-pole, the element is turned ON. The coils 18 and 19 are wound preferably continuously in bifilar manner to comprise first and second windings $L_1$ and $L_2$ (FIG. 6), so that a direct current fed to the first winding $L_1$ will magnetize the wider stator pole 14 to be the S-pole and the narrower stator pole 15 to be the N-pole, whereas the second winding $L_2$ excited will cause these poles 14 and 15 magnetized conversely to be the N-pole and S-pole respectively.

When a DC voltage is applied through the power supply control circuit PCC of FIG. 6 to the motor 10 with the rotor 12 in the stationary position of, for example, FIG. 2, a base current will flow through resistors $R_1$ and $R_2$ and a diode D to a first transistor $Q_1$, which causes the transistor $Q_1$ to be turned ON so that a direct current will flow through the first winding $L_1$. At this time, the Hall effect element 29 is detecting the S-pole and is being turned OFF, so that no current will flow through other transistors $Q_2$ and $Q_3$ nor through the second winding $L_2$. As a result, the stator poles 14 and 15 are magnetized to be the S and N poles, respectively, and thus the S and N pole magnetized rotor surfaces 26 and 27 facing these stator poles 14 and 15 respectively of the same polarities are to magnetically repulse against them to move circumferentially clockwise due to the foregoing deviated stationary position of the rotor, whereby the rotor 12 is caused to start rotating clockwise as shown in FIG. 3. When the rotor 12 is thus rotated and a forward end of the N-pole rotor surface 27 reaches the element 29, the element 29 detects the N-pole and is turned ON, so that a base current will flow through resistors $R_1$ and $R_3$ and element 29 to the second transistor $Q_2$ to turn ON the same and then to the third transistor $Q_3$ to turn ON the same, whereby the current is caused to flow through the second winding $L_2$. As the resistor $R_3$ is set to be of a value larger than that of the resistor $R_2$, the first transistor $Q_1$ is not turned ON and no current flows through the first winding $L_1$. Accordingly, the now excited winding $L_2$ magnetizes the stator poles 14 and 15 to be the N and S poles, respectively, to be the same polarities as the N and S pole rotor surfaces 27 and 26 here opposing, the repulsive motion of the rotor 12 occurs again, and the rotor 12 further rotates clockwise as shown in FIG. 5. This operation is repeated to carry out continuous rotation of the motor 10.

Figure 7:
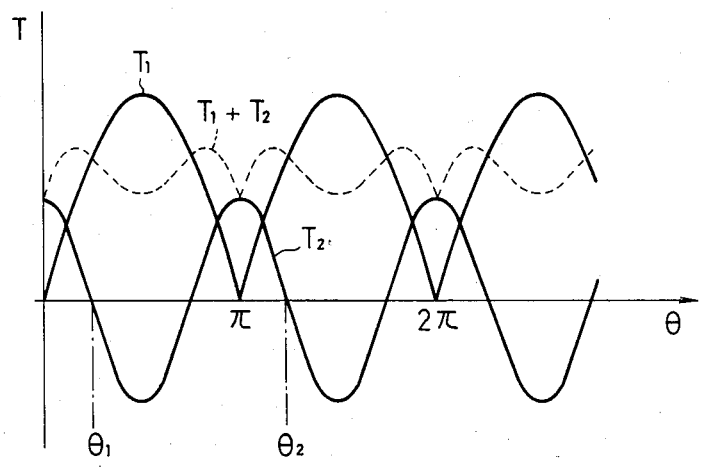
FIG. 7 is a diagram showing operational relationship between the rotational angle and torque of the rotor in the brushless motor of FIG. 1.

In the above operation, there occurs no zero torque point, and yet the motor can achieve a positive self-startability with a sufficiently large starting torque. Referring now to FIG. 7, the rotor 12 is being subjected simultaneously to both of main and auxiliary rotational torques such as shown by curves $T_1$ and $T_2$, in which the main torque $T_1$ is a resultant from a magnetic force generated by the magnetization of the stator poles 14 and 15 with the DC excited coils and a magnetic force of the permanent magnet 28, the main torque $T_1$ occurring upon every half cycle of rotation, and the auxiliary rotational torque $T_2$ is mainly due to a magnetic force that achieving the deviated stationary position of the rotor in the non-excited state. The auxiliary torque $T_2$ has a frequency which is twice that of the main torque $T_1$, but the deviated disposition of the narrower stator pole 15 with respect to the wider stator pole 14 causes the phase of the auxiliary torque $T_2$ to be shifted in the rotational direction of the rotor from that of the main torque $T_1$ by a rotary angle of $\theta_1$ or $\theta_2$, for example, so that a composite rotary torque of $T_1$ and $T_2$ will be as shown by a dotted-line curve $T_1+T_2$, which involves no zero torque point and is generally flat to lie substantially along a fixed level, whereby the motor 10 can be self-started and driven to be continuously smoothly rotated. It will be readily appreciated in this connection that the noticeably deviated disposition of the narrower stator pole 15 from the diametrally opposing position with respect to the wider stator pole 14 as well as the much smaller circumferential width also of the pole 15 are effective to remarkably enlarge the auxiliary torque $T_2$ and eventually the composite torque $T_1+T_2$ for achieving the larger starting torque.

Referring next to another embodiment of the present invention with reference to FIGS. 8 through 11 also in the case of the outer rotor type DC brushless motor 10 but adapted to four-pole arrangement, in which substantially the same constituent members as those in FIGS. 1 to 5 are denoted by the same reference numerals but increased by 100 and, where two of the same members are employed, the second one of such members is denoted by an additional suffix "a". In this embodiment, a stator 111 includes a pair of wider projected magnetic poles 114 and 114a opposing one another on a diametral line and a pair of narrower projected magnetic poles 115 and 115a also opposing one another on another diametral line. The opposing diametral lines of these pairs of the poles are not in perpendicular relation to each other so that the narrower pole 115 or 115a will be spaced from the wider pole 114a or 114 by an electric angle of preferably 140 to 160 degrees in the direction opposite the rotational direction of the rotor (the latter being clockwise in the drawings), and the circumferential width of the narrower poles 115 and 115a are made to be preferably 40-60% of the wider poles 114 and 114a. Further, a Hall effect element 129 is disposed as spaced from the central line of the wider pole 114 in the rotor's rotational direction by an electric angle of preferably 90 degrees. A rotor 112 comprises a cylindrical permanent magnet 128 having four regularly divided and alternately oppositely magnetized surfaces 126, 127, 126a and 127a in correspondence in number to the stator poles.

Figure 8:
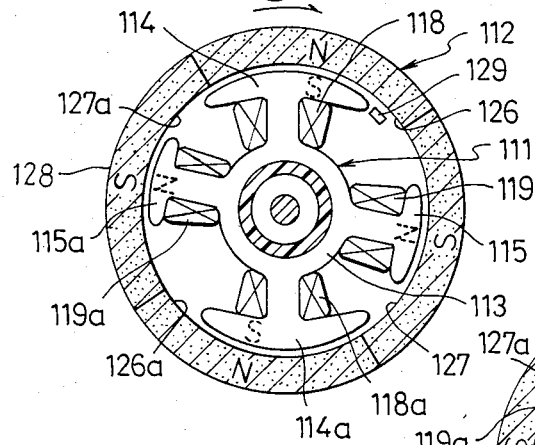
FIG. 8 is a horizontal sectional view similar to FIG. 2 of the outer rotor type DC brushless motor in another embodiment of the present invention.
Figure 9:
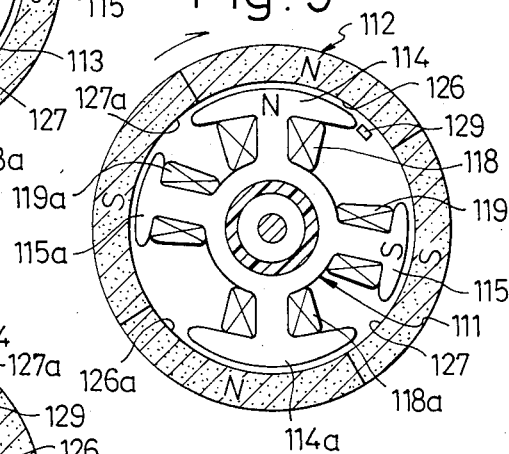
FIGS. 9 to 11 are horizontal sectional views similar to FIG. 8 for showing respectively different states in rotating operation of the rotor in the embodiment of FIG. 8.
Figure 10:
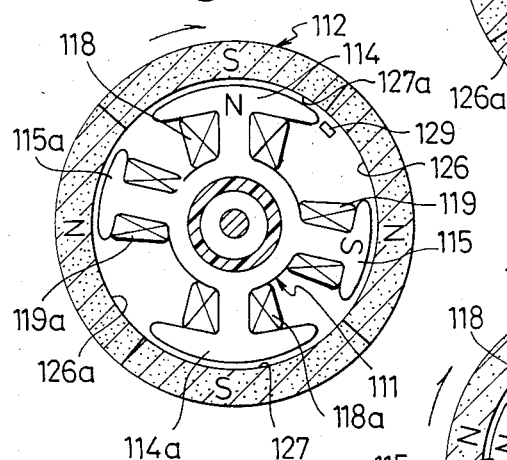
Figure 11:
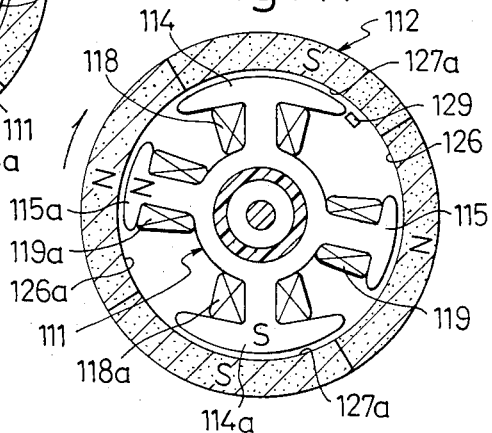

In non-excited state of coils 118, 119, 118a and 119a, the rotor 112 remains stationary in such state as shown in FIG. 8, in which the centers of the S-pole magnetized surfaces 127 and 127a are aligned with the centers of the narrower stator poles 115 and 115a due to their concentrated magnetic flux, and the Hall effect element 129 detects the N-pole position for another magnetized surface 126 of the rotor, so that a direct current feed in a first direction to the coils as controlled by the power supply control circuit PCC of FIG. 6 will cause the stator poles 114, 115, 114a and 115a respectively to be magnetized to be of the same polarities as the rotor's magnetized surfaces 126, 127, 126a and 127a facing these stator poles. As a result, the magnetic repulsive action takes place between the stator 111 and rotor 112 to shift the rotor 112 from the position of FIG. 9 to a position of FIG. 10 and reaches a position of FIG. 11 due to the moment of inertia. In this position of FIG. 11, the Hall effect element 129 detects the S-pole position of the rotor and provides a direct current in a second direction opposite to the foregoing first direction to the coils 118, 119, 118a and 119a, so as to continuously rotate the rotor 112. Other arrangement and operation of this embodiment are substantially the same as those of the embodiment of FIGS. 1 to 5.

The present invention may be modified in various ways. For example, the number of the stator poles as well as that of the permanent magnet rotor poles may be increased as required. Further, the permanent magnet rotor may be disposed inside the stator when a columnar permanent magnet polarized on the peripheral surface and a stator arranged to surround such magnet are employed. Yet, the narrower stator pole or poles may be formed into an L shape, instead of the foregoing T shape, in which event the disposition of the L-shaped narrower stator pole may be modified in such that the radial projection itself of the pole is made at a symmetric position on the stator with resepct to the wider stator pole, without being deviated therefrom, and the circumferential extension only of the narrower stator pole is disposed to be at the deviated position of the electric angle of 140 to 160 degrees in the direction reverse to the rotational direction of the rotor.

What is claimed as my invention is:

1. A DC brushless motor comprising:
    a rotor including a permanent magnet magnetized to have a plurality of at least four poles arranged to be of circumferentially alternately opposite polarities;
    a stator provided with a plurality of projected pole parts corresponding in number to said at least four poles of said rotor, said pole parts including circumferentially alternating wider and narrower pole parts,
    each of said narrower pole parts having a center line which is non-equidistantly spaced in the circumferential directions with respect to a center line of each of said wider pole parts,
    first coils wound on said wider pole parts and second coils wound on said narrower pole parts for exciting the wider pole parts to be mutually of the same polarity and opposite the polarity of the narrower pole parts;
    said coils being adapted to reverse the polarity of the pole parts,
    a single Hall effect element disposed opposite said rotor for detecting the polarity of a rotor pole disposed at a predetermined location relative to said stator and for providing a control signal dependent upon a detected polarity; and
    means responsive to said control signal for supplying a direct current in one direction to said first and second coils when one type of polarity is detected by said single Hall effect element and in a reverse direction to said first and second coils when the opposite type of polarity is detected by said single Hall effect element, for reversing the polarity of said poles.

* * * * *